United States Patent
Ruiz

(10) Patent No.: US 10,597,821 B2
(45) Date of Patent: Mar. 24, 2020

(54) SYSTEM AND PROCESS FOR STRIPPING VOLATILE ORGANIC COMPOUNDS FROM FOUL CONDENSATE

(71) Applicant: Veolia Water Technologies, Inc., Moon Township, PA (US)

(72) Inventor: Iván Ramos Ruiz, Llodio (ES)

(73) Assignee: Veolia Water Technologies, Inc., Moon Township, PA (US)

( * ) Notice: Subject to any disclaimer, the term of this patent is extended or adjusted under 35 U.S.C. 154(b) by 71 days.

(21) Appl. No.: 15/761,843

(22) PCT Filed: Sep. 21, 2016

(86) PCT No.: PCT/US2016/052751
§ 371 (c)(1),
(2) Date: Mar. 21, 2018

(87) PCT Pub. No.: WO2017/053342
PCT Pub. Date: Mar. 30, 2017

(65) Prior Publication Data
US 2018/0274171 A1    Sep. 27, 2018

(30) Foreign Application Priority Data
Sep. 24, 2015 (ES) .................................. 201531368

(51) Int. Cl.
*D21C 11/06* (2006.01)
*D21C 11/00* (2006.01)
*B01D 3/14* (2006.01)
*B01D 5/00* (2006.01)
*B01D 1/28* (2006.01)

(52) U.S. Cl.
CPC .............. *D21C 11/06* (2013.01); *B01D 1/284* (2013.01); *B01D 3/14* (2013.01); *B01D 3/148* (2013.01); *B01D 5/006* (2013.01); *B01D 5/0063* (2013.01); *D21C 11/0064* (2013.01)

(58) Field of Classification Search
CPC .... D21C 11/06; D21C 11/0064; B01D 1/284; B01D 3/00; B01D 3/14; B01D 3/148; B01D 5/00; B01D 5/0003; B01D 5/0057–0063; B01D 5/0075
USPC ......................................................... 162/29
See application file for complete search history.

(56) References Cited

U.S. PATENT DOCUMENTS

| | | | |
|---|---|---|---|
| 5,989,394 A * | 11/1999 | Johansson | B01D 3/34 159/16.3 |
| 6,383,342 B1 * | 5/2002 | Ohman | B01D 3/38 162/46 |

FOREIGN PATENT DOCUMENTS

| | | |
|---|---|---|
| WO | 9623566 | 8/1996 |
| WO | 0034569 | 6/2000 |
| WO | 2009053518 A2 | 4/2009 |

* cited by examiner

*Primary Examiner* — Dennis R Cordray
(74) *Attorney, Agent, or Firm* — Coats & Bennett PLLC

(57) ABSTRACT

A system and process is disclosed for treating foul condensate such as foul condensate produced in a Kraft pulp mill. Foul condensate is directed through a steam stripper to produce a clean condensate that is partially evaporated by a volatile rich vapor stream produced by the steam stripper in the course of treating the foul condensate. Vapor produced by the evaporation of the clean condensate is directed to one or more electrically driven mechanical vapor re-compressors that produce the steam that is used in the steam stripper.

13 Claims, 1 Drawing Sheet

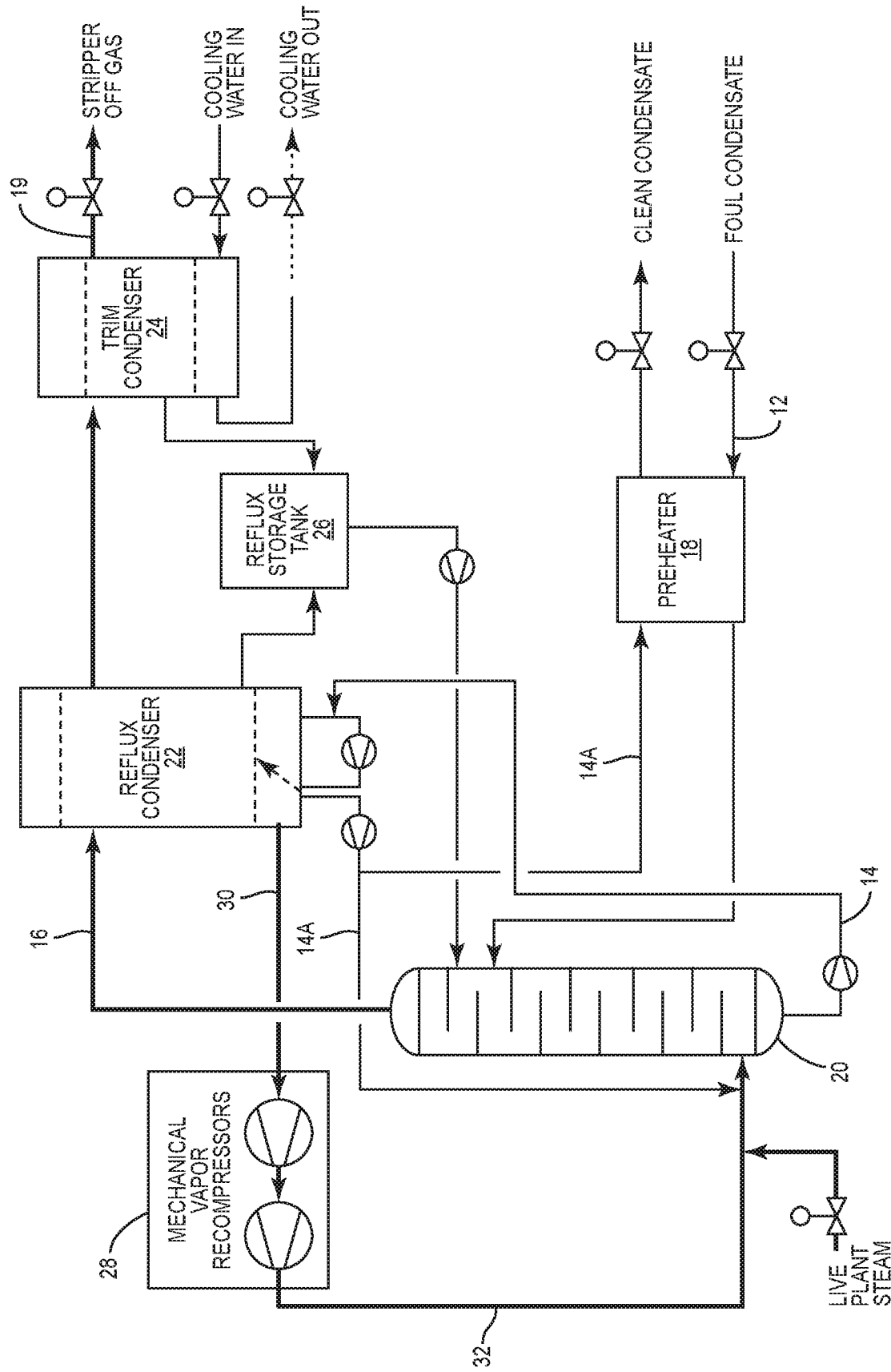

SYSTEM AND PROCESS FOR STRIPPING VOLATILE ORGANIC COMPOUNDS FROM FOUL CONDENSATE

This application is a U.S. National Stage Application of PCT Application No. PCT/EP2016/052751, with an international filing date of 21 Sep. 2016. Applicant claims priority based on Spanish Patent Application Nos. P201531368 filed 24 Sep. 2015. The subject matter of these applications is incorporated herein.

FIELD OF THE INVENTION

The present invention relates to treating foul condensates, such as those produced by Kraft wood pulping mills.

BACKGROUND OF THE INVENTION

In Kraft pulp mill processes, black liquor is produced by digesters. This black liquor is subjected to an evaporation process that typically produces various classes of condensate ranging from a relatively clean condensate to a foul condensate. Foul condensates from evaporators typically contain reduced sulfur compounds and organic compounds such as methanol which contribute greatly to pulp mill water pollution in the form of biochemical oxygen demand (BOD) and toxicity and air pollution in the form of volatile organic compounds. Because of this, foul condensates are generally collected and treated by stripping the pollutants from the foul condensate. Plant steam is typically used to clean foul condensate. This approach is not always the most cost effective way for treating foul condensate, Therefore, there has been and continues to be a need for an economical and practical approach to treating foul condensate, especially those produced in Kraft pulp mill processes.

SUMMARY OF THE INVENTION

The present invention relates to a system and method for treating foul condensate. Foul condensate is directed through a steam stripper to produce a clean condensate. A portion of the clean condensate is evaporated by a volatile rich vapor stream produced by the steam stripper in the course of treating the foul condensate. Vapor produced by the evaporation of the clean condensate is directed to one or more electrically driven mechanical vapor re-compressors that compress and thus produce the steam that is used in the steam stripper.

In one particular embodiment of the present invention, the method includes treating foul condensate. The foul condensate is directed downwardly through a stripping column. The method entails producing steam and directing the steam upwardly through the stripping column and stripping volatile compounds from the foul condensate to produce a clean condensate and a volatile rich vapor stream that contains volatile compounds. The volatile rich vapor stream is directed to a reflux condenser that condenses a portion of the volatile rich vapor stream to produce a reflux. The method and system is utilized to direct at least a portion of the clean condensate from the stripping column through the reflux condenser and partially evaporating the clean condensate to produce a vapor stream. The vapor stream is directed to one or more electrically powered mechanical vapor re-compression units that re-compress and thus converts the vapor stream to steam that is then directed into the stripping column.

Other objects and advantages of the present invention will become apparent and obvious from a study of the following description and the accompanying drawings which are merely illustrative of such invention.

DESCRIPTION OF THE DRAWINGS

FIG. 1 is a schematic illustration of the system and process for stripping volatile organic compounds from foul condensate.

DESCRIPTION OF EXEMPLARY EMBODIMENTS

In what is called the Kraft process, pulp mills produce black liquor. The black liquor is subjected to an evaporation process that produces condensate that, for the most part, can be used in various processes in the pulp mill. Generally condensate produced in the evaporation process can be grouped according to its quality or cleanliness. For example, the highest quality condensate (Class A) is often used for pulp washing while an intermediate quality condensate (Class B) can be used in the recaustizing section of the pulp mill. Evaporation of the black liquor also produces the foul condensate. In some pulp mills, additional foul condensate is produced by stripping processes associated with the pulp digester. Some foul condensate can be also produced at the Recovery Boiler. In any event, foul condensate includes methanol and other volatile compounds that are released during the early stages of the evaporation process. Generally, the foul condensate contains methanol, reduced sulfur compounds and other compounds such as ethanol, acetic acid, all of which lead to unacceptable levels of chemical oxygen demand (COD).

The present invention is directed to a system and process for removing foul condensate produced in industrial processes, such as in pulp mills. As discussed below, foul condensate is directed through a stripper that removes volatile compounds from the foul condensate and produces a clean condensate. A portion of the clean condensate is evaporated by a volatile rich vapor stream produced by the steam stripper. The vapor produced by evaporating the clean condensate is directed to one or more electrically driven mechanical vapor re-compressors that produce steam that is used in the steam stripper to strip volatile compounds from the foul condensate.

With particular reference to the drawing (FIG. 1), foul condensate 12 is directed to a pre-heater 18 which heats the foul condensate. Heat is provided to the pre-heater 18 by relatively hot purified condensate 14A produced by the system. In the process of heating the foul condensate, the hot purified condensate is cooled. After the foul condensate 12 has been heated by the pre-heater 18, it is directed into the upper portion of a striping column 20. Generally, the foul condensate is injected or directed into the stripping column 20 below the rectification section of the stripping column. Stream 32 is injected into the lower part of the stripping column 20. The generation of the steam 32 that is injected into the stripping column 20 is discussed subsequently herein. In any event, the steam 32 directed into the lower part of the stripping column 20 rises up through the stripping column and contacts the downwardly flowing foul condensate. In the process, the steam 32 moving up through the stripping column strips or removes volatile compounds from the foul condensate. This produces a volatile rich vapor stream 16 that is vented from the upper portion of the stripping column 20. Stripping of volatile compounds from the foul condensate in the stripping column 20 produces a clean condensate 14 that is pumped or directed from the bottom of the stripping column 20.

The volatile rich vapor stream 16 vented from the stripping column 20 is directed into and through a reflux condenser 22. In the reflux condenser, a portion of the volatile rich vapor stream 16 condenses and forms a liquid reflux that is collected in the shell of the reflux condenser. The volatile rich vapor stream 16 then flows from the reflux condenser 22 to a trim condenser 24. Note that cooling water or other cooling media as for instance cold black liquor is directed into and through the trim condenser 24 to aid or facilitate in condensing a portion of the volatile rich vapor stream passing through the trim condenser. As with the reflux condenser 22, a portion of the volatile rich vapor stream condenses as a liquid reflux in the trim condenser 24 and collects in the shell of the trim condenser. Trim condenser 24 produces a stripping gas 19 that typically comprises approximately 50% wt. water vapor and approximately 50% wt. methanol gas.

Reflux collected in the shells of the reflux condenser 22 and trim condenser 24 is directed to a reflux storage tank 26. From the reflux storage tank 26, the reflux is pumped into an upper portion of the stripping column 20 (rectification section) and is treated in the same manner as the foul condensate. That is, the collected reflux is contacted with upwardly flowing steam that strips volatile compounds therefrom and these volatile compounds form a part of the volatile rich vapor stream 16 vented from the stripping column 20.

The present system and process employs a mechanical vapor recompression system 28 to produce or generate the steam used in the stripping column 20 that removes volatile compounds from the foul condensate 12. The advantage of this approach, as compared to other conventional approaches, is that the mechanical vapor recompression system 28 employed here is driven by electricity which, in some localities, is more cost effective than other forms of energy. To achieve this, the clean condensate 14 is directed from the stripping column 20 to the reflux condenser 22. The clean condensate 14 is recirculated through the reflux condenser in a heat exchange relationship with the volatile rich vapor stream 16 flowing in the reflux condenser. Heat from the volatile rich vapor stream 16 is transferred to the clean condensate 14 and this produces a vapor 30 that is directed to one or more mechanical vapor re-compressors 28. The mechanical vapor re-compressors 28 compress the vapor 30 and produce steam 32 that is directed into the lower part of the stripping column 20. There may be situations where the steam 32 produced by the mechanical vapor rec-compressors 28 is insufficient to treat the foul condensate 12 and the reflux. In those cases, plant steam can be used to complement the stream 32 produced by the mechanical vapor re-compressors 28.

In the course of evaporating or heating the clean condensate 14 in the reflux condenser 22, it follows that a relatively hot clean condensate 14A is produced. Most of the hot clean condensate 14A is directed through the pre-heater 18 and heat therefrom is transferred to the foul condensate 12 passing through the pre-heater. A relatively small fraction of the hot clean condensate 14A is utilized to de-superheat the steam directed to lower part of the stripping column. De-superheating is achieved by the vaporization of the condensate injected into the steam line.

The system and method of the present invention is suitable for treating foul condensate from a wide variety of pulping processes. It is particularly useful when employed in a system and process for pulping wood which produces a wastewater stream that is typically referred to as liquor. The liquor, which is sometimes referred to as black liquor, is directed, in one example, to an evaporation unit that concentrates the black liquor to where the solids content is approximately 60-80%. The evaporation unit may produce a foul condensate and it is that foul condensate that can be treated by the system and process shown in the accompanying drawing.

The advantage to the present system and process lies in the use of the mechanical vapor re-compressors 28 to produce all or at least most of the steam required to strip volatile compounds from the foul condensate and reflux. Mechanical vapor re-compressors are powered by electricity, which, as noted above, is economical in some geographical locations. A second advantage of the present system and process lies in the use of the reflux condenser 22 to evaporate a portion of the clean condensate produced by the stripping column 20. That is, the reflux condenser 22 functions to evaporate a portion of the clean condensate and produce a vapor that forms the input to the mechanical vapor re-compressors 28 that produce the steam utilized in the stripping column 20. Finally, the system and process described above is extremely efficient in removing volatile compounds from the volatile rich vapor stream 16 vented from the stripping column 20. This is made possible, in part at least, by the functioning of the reflux condenser 22 and the trim condenser 24 in condensing a reflux condensate and recycling it to the stripping column 20 for further treatment. Overall, the system and process described above and shown in the drawings is a cost effective and efficient system and process for removing volatile compounds, particularly methanol, from foul condensate.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wood pulping process and a method for treating foul condensate produced in the wood pulping process comprising:

pulping wood and producing a liquor;

concentrating the liquor in one or more evaporators to produce a concentrated liquor and at least a foul condensate;

directing the foul condensate to a stripping column and directing the foul condensate downward through the stripping column;

producing superheated steam and directing the steam to and then upwardly through the stripping column to strip volatile compounds from the foul condensate and producing a clean condensate and a volatile rich vapor stream that is vented from the stripping column;

evaporating a portion of the clean condensate by heating the clean condensate with the volatile rich vapor stream and producing a vapor;

directing the vapor to one or more mechanical vapor recompression units and compressing the vapor to form at least a portion of the steam that is directed upwardly through the stripping column;

wherein in the course of heating the clean condensate, a hot clean condensate is produced; and utilizing a portion of the hot clean condensate to desuperheat the steam being directed to the stripping column.

2. The method of claim 1 including a reflux condenser that receives the volatile rich vapor stream and the clean condensate and where the method includes condensing a portion of the volatile rich vapor stream in the reflux condenser to produce a reflux and directing the reflux from the reflux condenser to the stripping column where the steam moving through the stripping column removes volatile compounds from the reflux.

3. The method of claim 2 including directing the volatile rich vapor stream from the reflux condenser to a trim condenser and condensing a part of the volatile rich vapor stream to form additional reflux and directing the reflux and the additional reflux to the stripping column for treatment therein.

4. The method of claim 1 including directing the clean condensate to a pre-heater and pre-heating the foul condensate.

5. The method of claim 1 including directing the vapor to one or more electrically driven mechanical vapor recompression units to form at least a portion of the steam that is directed upwardly through the stripping column.

6. The method of claim 1 including:
   directing the volatile rich vapor stream into a reflux condenser and condensing a portion of the volatile rich vapor stream to produce a liquid reflux;
   after condensing a portion of the volatile rich vapor stream in the reflux condenser, directing the volatile rich vapor stream to a trim condenser and condensing the volatile rich vapor stream to form additional liquid reflux;
   directing the liquid reflux and the additional liquid reflux to the stripping column and downwardly through the stripping column where the liquid reflux and additional liquid reflux are contacted by the steam moving upwardly through the stripping column; and
   wherein evaporating a portion of the clean condensate includes directing the clean condensate to the reflux condenser and transferring heat from the volatile rich vapor stream passing through the reflux container to the clean condensate to produce the vapor that is directed to the one or more mechanical vapor recompression units.

7. A method of treating foul condensate, comprising:
   directing the foul condensate downwardly through a stripping column;
   producing superheated steam and directing the steam to and then upwardly through the stripping column and stripping volatile compounds from the foul condensate to produce a clean condensate and a volatile rich vapor stream that contains volatile compounds;
   directing the volatile rich vapor stream to a reflux condenser and condensing a portion of the volatile rich vapor stream to produce a reflux;
   directing at least a portion of the clean condensate from the stripping column to the reflux condenser and partially evaporating the clean condensate to produce a vapor stream and a hot clean condensate;
   directing the vapor stream produced in the Reflux Condenser to one or more electrically powered mechanical vapor re-compression units and converting the vapor stream to produce at least a portion of the steam that is directed upwardly through the stripping column; and
   utilizing a portion of the hot clean condensate to desuperheat the steam being directed to the stripping column.

8. The method of claim 7 further including directing the reflux to the stripping column and downwardly through the stripping column where the upwardly moving steam contacts the reflux and strips volatile compounds therefrom.

9. The method of claim 7 including directing another portion of the hot clean condensate from the reflux condenser to a pre-heater for heating the foul condensate.

10. The method of claim 7 wherein there is provided a trim condenser located downstream of the reflux condenser and the method includes directing the volatile rich vapor stream from the reflux condenser to the trim condenser and partially condensing the volatile rich vapor stream in the trim condenser to produce additional reflux, and wherein the method includes directing the reflux from the reflux condenser and the trim condenser to the stripping column for further treatment therein.

11. A wood pulping process and a method for treating foul condensate produced in the wood pulping process comprising:
   pulping wood and producing a liquor;
   concentrating the liquor in one or more evaporators to produce a concentrated liquor and at least a foul condensate;
   directing the foul condensate to a stripping column and directing the foul condensate downward through the stripping column;
   producing steam and directing the steam upwardly through the stripping column to strip volatile compounds from the foul condensate and producing a clean condensate and a volatile rich vapor stream that is vented from the stripping column;
   evaporating a portion of the clean condensate by heating the clean condensate with the volatile rich vapor stream and producing a vapor;
   wherein producing the steam comprises:
      without the addition of live steam, directing only the vapor produced from the clean condensate to one or more electrically driven mechanical vapor recompression units and compressing the vapor to form a portion of the steam directed into the stripping column; and
      after the vapor has been compressed by the mechanical vapor recompression units, injecting live steam into the vapor produced by the mechanical vapor recompression units at a location downstream of the mechanical vapor recompression units.

12. The method of claim 11 including a reflux condenser that receives the volatile rich vapor stream and the clean condensate and where the method includes condensing a portion of the volatile rich vapor stream in the reflux condenser to produce a reflux and directing the reflux from the reflux condenser to the stripping column where the steam moving through the stripping column removes volatile compounds from the reflux.

13. The method of claim 12 including directing the volatile rich vapor stream from the reflux condenser to a trim condenser and condensing a part of the volatile rich vapor stream to form additional reflux and directing the reflux and the additional reflux to the stripping column for treatment therein.

* * * * *